(12) United States Patent
Yang

(10) Patent No.: US 9,567,412 B2
(45) Date of Patent: Feb. 14, 2017

(54) SUPERINSULATION WITH NANOPORES

(71) Applicant: Industrial Science & Technology Network, Inc., Lancaster, PA (US)

(72) Inventor: Arthur J. Yang, York, PA (US)

(73) Assignee: Industrial Science & Technology Network, Inc., Lancaster, PA (US)

( * ) Notice: Subject to any disclaimer, the term of this patent is extended or adjusted under 35 U.S.C. 154(b) by 239 days.

(21) Appl. No.: 14/336,393

(22) Filed: Jul. 21, 2014

(65) Prior Publication Data

US 2014/0329922 A1 Nov. 6, 2014

Related U.S. Application Data

(62) Division of application No. 12/736,709, filed as application No. PCT/US2009/002693 on May 1, 2009, now Pat. No. 8,785,509.

(60) Provisional application No. 61/071,511, filed on May 2, 2008.

(51) Int. Cl.
| | |
|---|---|
| *C08F 12/08* | (2006.01) |
| *C04B 26/10* | (2006.01) |
| *C04B 38/10* | (2006.01) |
| *C08J 9/12* | (2006.01) |
| *C08G 18/08* | (2006.01) |
| *C04B 111/00* | (2006.01) |
| *C04B 111/40* | (2006.01) |
| *C08G 101/00* | (2006.01) |

(52) U.S. Cl.
CPC .............. *C08F 12/08* (2013.01); *C04B 26/10* (2013.01); *C04B 38/103* (2013.01); *C08G 18/14* (2013.01); *C08J 9/122* (2013.01); *C04B 2111/00853* (2013.01); *C04B 2111/40* (2013.01); *C08G 2101/00* (2013.01); *C08J 2201/032* (2013.01); *C08J 2203/06* (2013.01); *C08J 2205/042* (2013.01); *C08J 2325/00* (2013.01); *C08J 2375/04* (2013.01)

(58) Field of Classification Search
CPC ...... C08F 12/08; C08G 18/14; C08G 2101/00; C08J 9/122; C08J 2201/032; C08J 2325/00; C08J 2375/04; C08J 2203/06; C08J 2205/042; C04B 26/10; C04B 2111/40; C04B 2111/00853; C04B 14/10; C04B 24/2676; C04B 24/282; C04B 38/103; C04B 38/0051; C04B 38/0054
See application file for complete search history.

(56) References Cited

U.S. PATENT DOCUMENTS

| | | | |
|---|---|---|---|
| 2,888,407 A | 5/1959 | Cooper et al. | |
| 4,595,709 A | 6/1986 | Reischl | |
| 5,629,353 A * | 5/1997 | Steckle, Jr. | .......... B01D 67/003 264/50 |
| 6,693,159 B1 * | 2/2004 | Holmes | .................... B01J 20/26 526/323.1 |
| 7,390,474 B2 * | 6/2008 | Suzuki | .................... B01J 21/18 423/445 R |
| 8,008,362 B2 | 8/2011 | Schadler et al. | |
| 8,067,480 B2 | 11/2011 | Schmidt et al. | |
| 8,268,411 B2 | 9/2012 | Gates et al. | |
| 2004/0266941 A1 | 12/2004 | Houston et al. | |
| 2005/0051917 A1 | 3/2005 | Grothe et al. | |
| 2005/0230659 A1 | 10/2005 | Hampden-Smith et al. | |
| 2005/0256275 A1 | 11/2005 | Kobayashi et al. | |
| 2006/0014908 A1 * | 1/2006 | Rotermund | ......... C04B 38/0022 525/452 |
| 2006/0090649 A1 | 5/2006 | Liu et al. | |
| 2006/0178443 A1 | 8/2006 | Boinowitz et al. | |
| 2007/0227748 A1 | 10/2007 | Liggat et al. | |
| 2008/0026041 A1 | 1/2008 | Tepper et al. | |
| 2012/0308804 A1 | 12/2012 | Lendlein et al. | |

FOREIGN PATENT DOCUMENTS

WO    WO 00/24799    5/2000

* cited by examiner

*Primary Examiner* — John Cooney
(74) *Attorney, Agent, or Firm* — Jones Day

(57) ABSTRACT

This invention relates to the field of thermal insulation. In particular, the invention describes superinsulation articles having a desired porosity, reduced pore size and cost-effective methods for manufacturing such articles. In one aspect of the present invention, the article may comprise a material system with at least about 20% porosity. In a further aspect of the invention, an article may comprise greater than about 25% of nanopores having a pore size no greater than about 1500 nanometers in its shortest axis.

16 Claims, 3 Drawing Sheets

SUPERINSULATION WITH NANOPORES

CROSS REFERENCE TO RELATED APPLICATIONS

This application is a divisional of U.S. Pat. No. 12/736,709, filed Jan. 6, 2011, which is the National Phase of International Application No. PCT/US2009/002693, filed May 1, 2009, and which further claims the benefit of U.S. Provisional Application No. 61/071,511, filed May 2, 2008. The foregoing related applications, in their entirety, are incorporated herein by reference.

SUMMARY OF INVENTION

This invention relates to the field of thermal insulation. In particular, the invention describes superinsulation articles having a desired porosity, reduced pore size and cost-effective methods for manufacturing such articles. In one aspect of the present invention, the article may comprise a material system with at least about 20% porosity. In a further aspect of the invention, an article may comprise greater than about 25% of nanopores having a pore size no greater than about 1500 nanometers in its shortest axis.

The articles of the present invention may be used for a variety of sound and/or thermal insulation applications including building insulation, refrigeration insulation, industrial insulation, and HVAC insulation products. The articles may also be used for specialty insulation products including space vehicles, space stations, aviation, and superconducting devices and equipment. Finally, the articles of the present invention may be used as a foam product for structural support, cushioning, protection, packaging, sports, entertainment, sound insulating, medical devices, and decoration.

BACKGROUND OF THE INVENTION

The first generation of thermal insulation included materials with naturally low densities such as cotton, wool, cork and asbestos. Since entrapped air (with thermal conductivity as low as 23 mW/M·°K) was the primary insulator, a lower density (more air) corresponded to a higher insulation value (i.e. lower thermal conductivity). The second-generation insulations were industrially processed, porous substrates containing even more air (lower density and more insulating). These insulations included fiberglass, rubber and plastic foams, and other man-made porous substrates. The scheme used by the second generation, lowering the thermal conductivity (K value) by reducing density, finally reached its bound (~30 mW/M·°K)[1] when such practices began compromising insulation strength and performances, attributed to too much air as well as excessive radiation heat loss. The third generation has evolved with the emergence of nanotechnology. Modeling results demonstrated that if the pore size of insulation could be reduced to below mean free path[2] of air, i.e. <100 nm, the insulation value can be substantially increased by reducing the low thermal conductivity of entrapped air even lower.

[1] Some insulation materials on market have thermal K lower than this value due to the addition of heavier gases such as HCFC and CFC. They are not considered as a new generation of insulation because their thermal K will rise to the 2nd generation limit value after the heavier gases diffusing out of the substrate over certain use time.
[2] Mean free path: the average distance traveled by a molecule between two consecutive collisions.

Between 1992 and 1995, we demonstrated this feasibility while working at Armstrong World Industries on a $4.5 million project awarded by the Advanced Technology Program[3]. By reducing the pore size to nanometer scales, we successfully made several nanopore composites with super insulation properties. The following table listed data of previous samples in comparison with a second generation insulation, fiberglass:

| Insulation Material | Thermal K (mW/M · °K) | R/inch* |
|---|---|---|
| Fiber Glass | 45 | 3.2 |
| Granular Silica Aerogel | 23 | 6.3 |
| Aerogel with Layered Silicates Panels | 16 | 9 |
| Inverse-Emulsion Composite Panels | 20 | 7.2 |
| Aerogel-Polymer Microcomposites | 17 | 8.7 |
| Inorganic-Organic Composite Aerogel | 13 | 10.5 |

*R-per-inch is a commonly used measure of insulation value. It is equivalent to the reciprocal of the thermal conductivity in unit of Btu · in/hr · ft² · °F. The energy code is given by R-value, i.e. R-per-inch times thickness.

These new materials failed to reach markets because of their high processing costs. This class of material is a super insulation due to a combination of high porosity and nanometer-size pores. These special structural attributes are also causing its processing difficulties. The high porosity material is mechanically weak. When drying under ambient conditions, capillary stress from the liquid meniscus in the pore shrinks the material and results in significant structural damages. For pores of nanometer size, this stress can be in the range of a hundred bars (~1500 pounds per square inch); the smaller the pore, the higher the stress. The shrinkage due to high stress reduced the porosity and the number of nanometer pores in the material structure; resulting in substantial loss of its super insulation value after ambient processing.

[3] "Thermal Insulation Materials-Morphology Control and Process for the Next Generation of Performance," ATP award to Armstrong World Industries, Inc. (1992).

One solution to this problem was to dry the wet gel under supercritical conditions of a fluid (most conveniently, by using supercritical $CO_2$ fluid). This had allowed the liquid system to bypass the coexisting (infinitely compressible) region and avoid generating any meniscus within the pores. This processing requirement, drying the material under a supercritical condition, instead of ambient condition, was the reason for the high capital and processing costs associated with the production of nanopore insulation. The following table provides direct comparisons of making insulation by solution process to that by gas foaming process, which is the most widely process used for making the second generation of insulation.

| Process Characteristics | Gelation and Drying (Aerogel, Hydrogel) | Direct Gas Foaming (Gas Blown Polymer Foams) |
|---|---|---|
| a. Porosity is Created by: | Liquid solvent | Gas Bubbles |
| b. Fluid Weight % Needed for Creating 95% Porosity | 2000% | 5~10% |
| c. Processing Speed | Fluid diffusion, depending on sample thickness ($\delta$), $\propto \delta^2$, slow | Gas blown, instantaneous |
| d. Pore Size Control | 10 nm, needs special processing care to preserve the nanopores | 100-500µ, very difficult to control |
| e. Thermal Conductivity | 20 mW/M · °K | 30-35 mW/M · °K |

If we can replace the solution drying process and make nanopore insulation by foaming, the cost reductions will be well beyond those needed to make the technology commercially viable. Recently, we had successfully developed the technology of producing low-density (density ~0.03 g/cc) Styrofoam insulation by foaming with 100% $CO_2$. By integrating the two technologies together, we could design a system that utilizes supercritical $CO_2$ to first create and preserve nanometer gas embryos (by a nucleation process), and, then to expand gas bubbles (by a foaming process) for making low-density insulation. Such a system could produce high-porosity foams with extremely small pore sizes. The challenge, of course, remained as how to effectively control the bubbles' size during the rapid foaming process.

A foaming process consisted of rapid generation of numerous gas bubble nuclei, followed by their fast growth during the foam's expansion. We could envision two approaches to control the pore size during such a rapid bubbling process. First, we plan to induce the homogeneous nucleation process (already demonstrated by pressure vessel experiments) in a foam extrusion process to generate extremely small gas embryos, followed by controlling the bubbles' growth. Or, we can use a reactive system, such as the polymerization of styrene or urethane, which secrete out volatile solvent, or co-solvent, during its polymerization and depressurization, to create a spinodal decomposition, followed by controlled expansion of the entrapped volatile fluid phase. Both processes required a low initial interfacial tension, as well as a controlling mechanism to slow down the bubble growths. Either process, if successful in generating fine pores and high porosity, would lead to a breakthrough in producing nanopore insulation because of the tremendous cost savings attributed to the rapid depressurization of supercritical $CO_2$ (or similar volatile fluids). Obviously, such a breakthrough process would be difficult, because it would require orders of magnitude improvement in pore size controls (from ~100 microns to 0.1 micron) comparing to prior foaming arts.

DETAILED DESCRIPTION OF THE INVENTION

Figure 1:
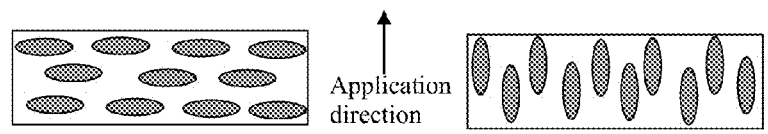
FIG. 1 shows spheroids aligned in-series (left), or in-parallel with the application direction. Left example (in-series) has a higher insulation value than that of right example.

This invention relates to the field of thermal insulation. In particular, the invention describes superinsulation articles having a desired porosity, reduced pore size and cost-effective methods for manufacturing such articles. In one aspect of the present invention, the article may comprise a material system with at least about 20% porosity, for example, 30%, 40%, 50%, 60%, 70%, 80%, preferably at least about 90% porosity, for example, 95%, 96%, 97%, 98%, and 99%. In a further aspect of the invention, an article may comprise greater than about 25%, 50%, 75%, and 90% of nanopores having a pore size no greater than about 1500 nanometers, for example, 1250 nanometers, 1000 nanometers, preferably no greater than about 900 nanometers, 800 nanometers, 750, nanometers, 700 nanometers, 650 nanometers, 600 nanometers, and 550 nanometers, in its shortest axis.

The articles of the present invention, in addition to porosity and a reduced pore size, may also comprise asymmetrical nanopores. In one aspect of the present invention, the articles may comprise greater than about 10% asymmetrical pores, for example, 25%, 40%, and 50%, preferably greater than about 75%, 80%, 90%, and 95%. One aspect of the present invention is an article comprising greater than about 25%, for example, 35%, 50%, preferably greater than about 75%, for example, 80%, 85%, 90%, and 95% oblate or substantially oblate nanopores. Another aspect of the present invention is an article comprising greater than about 25%, for example, 35%, 50%, preferably greater than about 75%, for example, 80%, 85%, 90%, and 95% prolate or substantially prolate nanopores. Yet, another aspect of the present invention may be an article comprising nanopores having an asymmetry unlike oblate or prolate but maintaining a controlled pore dimension in a preferred application directions (e.g., the thermal gradient direction). Furthermore, an article of the present invention may comprise a combination of oblate or substantially oblate, prolate or substantially prolate, and other asymmetrical nanopores.

The articles of the present invention may also comprise nanopores oriented in a preferred direction. In one aspect of the present invention, one or more nanopores are oriented normal to the application direction (i.e. when reference is made herein the orientation of the nanopore is referring to the longest axis of the pore. Therefore, the longest axis of the pore, and the pore orientation, is normal to the application direction. Conversely, the shortest axis is aligned with the application direction.) or substantially normal to the application direction. In another aspect of the present invention, one or more nanopores are oriented normal to the thermal gradient direction or substantially oriented normal to the thermal gradient direction. In another aspect of the present invention, one or more nanopores are oriented along the machine direction (i.e. the shortest axis normal to the machine direction) or substantially along the machine direction. Yet, in one aspect of the present invention, an article may comprise greater than about 25%, for example, 35%, 45%, 55%, preferably greater than 75%, for example 80%, 85%, 90%, and 95%, of nanopores oriented normal to the thermal gradient direction or substantially oriented normal to the thermal gradient direction.

The articles of the present invention may also comprise a secondary nanostructure. Furthermore, the articles of the present invention may comprise a tertiary and/or quaternary nanostructure. In one aspect of the present invention, an article may comprise greater than about 25%, for example, 35%, 45% and 50%, preferably greater than about 75%, 80%, 85%, 90%, and 95%, of nanopores with secondary, tertiary and/or quaternary structure. One aspect of the present invention is an article comprising a secondary nanostructure comprising a surfactant or alternatively any known surface-tension lowering agents or functionally equivalent thereof. A further aspect of the present invention may be an article comprising greater than about 25%, for example, 35%, 45%, and 50%, preferably greater than about 75%, 80%, 85%, 90%, and 95%, of nanopores with a surfactant or known equivalent thereof. Another aspect of the present invention may be a secondary nanostructure comprising an intertwining fractal structure or alternatively a substantially intertwining fractal structure. A further aspect of the present invention may be an article comprising greater than about 25%, for example, 35%, 45%, and 50%, preferably greater than about 75%, 80%, 85%, 90%, and 95%, of nanopores with an intertwining fractal structure and/or substantially intertwining fractal structure. Yet, another aspect of the present invention may be an article comprising greater than 5%, for example, 10%, 20%, 50%, nanopores having one or more secondary, tertiary, and/or quaternary structures.

Furthermore, the articles of the present invention may have a thermal insulation value greater than about 6 R/inch, for example 6.5 R/inch, and 7 R/inch, preferably greater than about 7.5 R/inch, for example 8R/inch, 8.5 R/inch, 9 R/inch, 9.5 R/inch, and 10 R/inch. In another aspect of this invention, the articles of the present invention may have a thermal conductivity value less than about 30 mW/M° K, for example 25 mW/M° K, and 23 mW/M° K, preferably less than about 22 mW/M° K, for example 21 mW/M° K, 20 mW/M° K, and 15 mW/M° K.

The articles of the present invention may be manufactured by creating or generating or substantially creating or generating one or more gas embryos. In one aspect of the present invention, the gas embryos or the known equivalent thereof are created by homogenous nucleation or any other known means of nucleation without preferential nucleation sites. In one aspect of the present invention, an article comprises greater than about 25%, for example, 35%, 50%, preferably greater than about 75%, 80%, 85%, 90%, and 95%, of gas embryos created or generated by such means or the equivalent thereof. In another aspect of the present invention, the gas embryos are created or generated by spinodal decomposition or any known means creating a phase separation throughout the material and not just at the nucleation sites. In one aspect of the present invention, an article comprises greater than about 25%, for example, 35%, 50%, preferably greater than about 75%, 80%, 85%, 90%, and 95%, of gas embryos created or generated by spinodal decomposition or the equivalent means thereof. Yet, in another aspect of the present invention, a combination of such methods for creating or generating gas embryos may be used.

In a further aspect of the present invention, an article may comprise one or more gas embryos having a size not greater than about 1000 nanometers, for example, 900 nanometers, 800 nanometers, 700 nanometers, 600 nanometers, 550 nanometers, preferably not greater than 500 nanometers, for example, 450 nanometers, 400 nanometers, 350 nanometers, 300 nanometers, 250 nanometers, 200 nanometers, 150 nanometers, 100 nanometers, and 50 nanometers.

In another aspect of the present invention, the gas embryos may be expanded by or substantially expanded by using a foaming process, including any known equivalents means thereof. In one aspect of the present invention, an article comprises greater than about 25%, for example, 35%, 50%, preferably greater than about 75%, for example 80%, 85%, 90%, and 95%, of gas embryos expanded by, or substantially expanded by, batch foaming. In another aspect of the present invention, the gas embryos are expanded by or substantially expanded by a continuous foam extrusion process or an equivalent means thereof. In one aspect of the present invention, an article comprises greater than about 25%, for example, 35%, 50%, preferably greater than about 75%, for example 80%, 85%, 90%, and 95%, of gas embryos expanded by, or substantially expanded by, a continuous foam extrusion process. Yet, in another aspect of the present invention, the gas embryos are expanded by, or substantially expanded by, a combination of such means.

In yet a further aspect of the present invention, the pore size of greater than about 25%, for example, 35%, 50%, preferably greater than about 75%, for example, 80%, 85%, 90%, and 95% gas embryos is controlled by, or substantially controlled by, one or more restriction methods or equivalent restriction means thereof, including any known size controlling methods, affecting one or more of pore morphology, pore orientation, and/or secondary nanostructure aspects of the nanopores. In a further aspect of the present invention, the embedded inert gas may be exchanged by air over time. In one aspect of the present invention, greater than 5% of the inert gas, for example, 10%, 25%, and 40%, preferably greater than 50%, for example, 60%, 70%, 80%, 90% and 95%, may be exchanged by air over time. In another aspect of the present invention, embedded inert gas may be exchanged by air over time, such as greater than 10 days, for example 20 days, 30 days, and 45 days, preferably greater than 60 days, for example, 90 days, 120 days, 180 days, and 360 days. Accordingly, inert gas may include a mixture of the blowing gas (e.g., $CO_2$) and air, for example, at about 10:90, about 50:50, and about 90:10, percent blowing gas to percent air. Furthermore, inert gas may also include 100 percent blowing gas or 100 percent air.

The third generation of thermal insulation is defined as the insulation material composed of air pockets with composition and morphology specially designed to lower the embedded air's thermal conductivity below its ordinary value (i.e. <23 mW/M·° K), resulting in a super insulation of insulation value higher than at least R-7/inch. Prior arts (selected examples shown by above table) demonstrated the feasibility of making insulation with conductivity lower than 23 mW/M·° K when pore sizes were reduced to below the mean free path of air (<100 nm). However, relying completely on pore size reduction to make a super insulation has experienced the tremendous processing challenges when using a supercritical drying process. The inventions disclosed here take a different approach geared towards the cost-effective manufacturing of the third generation of thermal insulation. This new invention contains the following four important components, which collectively could realize the cost-effective production of the third generation of insulation with thermal conductivity much lower than the second generation products:

(a) Generating homogeneously smaller gas embryos or domains by a homogeneous nucleation, or spinodal decomposition process, using $CO_2$ entrapped as either a blowing agent or a co-solvent within a polymer system, (b) Growing asymmetrical (oblate or prolate) pore morphology, (c) Orienting asymmetrical (oblate or prolate) pores in a preferred direction, (d) Creating the secondary nanopore structure within air pores.

Prior nanopore structures of super insulation were accomplished by a solution supercritical drying process, which was extremely slow as well as capital intensive. The first innovation in this invention is to use the expansion power of a high-pressure gas embedded in the form of either a solute, or a co-solvent, to create the high porosity required by a super thermal insulation. Furthermore, the gas embryos or domains are created by a homogeneous nucleation, or spinodal decomposition, process in an effort to control the bubbles' growth from their initial births. Previously, gas bubble generation within such a system went through a heterogeneous nucleation process where the initial nuclei provided by the nucleating agents were already much larger than microns. As a result, the pore sizes in prior foams blown using heterogeneous nucleation were already substantially larger than the 100 nanometer required by super insulation.

Early models revealed that the gas thermal conductivity would not be reduced significantly unless the pore size was reduced below a threshold value between 1 and 0.1 micron. The simultaneous requirements of a high porosity (over 95%) and extremely small pore sizes were the main reasons that no foaming processes were successful in producing such a super insulation. After all, the task of increasing thermal insulation value of foams two and a half times higher, from the current R-4/inch to R-7~10/inch is extremely ambitious and, thus, inherently difficult.

The present invention incorporates three additional innovations (b, c, and d listed above) in addition to pore size reduction which are all capable of further increasing the insulation value of a porous substrate. These three options could each individually be utilized to improve insulation value of a current foam product. Collectively, they could be engineered, along with using pore size reduction, to accomplish the required technology jump to that of a super insulation through incremental technology improvements.

One unique aspect of the invention is the recognition and the design to utilize the directional characteristics of a transport property such as the thermal conductivity. For a composite of polymer and air pores, the spatial geometry and orientation of the pores could be utilized to improve the insulation value along the heat flow direction (i.e. the direction of the temperature gradient, or, the application direction). Analogous to the spatial arrangements of resistor-in-parallel (highest conductivity), and resistor-in-series (lowest conductivity), we can utilize the orientations of spheroid pores in parallel (long axis in parallel to the heat flow direction), or, in series (long axis normal to the heat flow direction) to optimize insulation value. Theory indicated that the increase of heat resistance in one direction (application direction) would be at the expenses of the resistances of the two other directions, which are irrelevant to insulation performances. As shown in FIG. 1, we have specific modeling calculations to corroborate and estimate these geometry and orientation effects.

The ability of using pore geometry and orientation to further complement the effect by pore size reduction provided substantial leverages of making a super thermal insulation. First of all, the difficult task of pore size reduction (to below the mean free path of air) could be limited to just one direction (the application direction), instead of all three directions. In other words, for spheroids oriented in series with the application direction, only their shortest axes need to be controlled below the threshold value. Relaxations of size controls in the other two irrelevant directions allow a much larger volume for each pore, and therefore, much less pore density be created by foaming. Secondly, the effects of geometry and orientation could help reduce thermal conductivity on top of what already achievable by pore size reduction. Moreover, unlike pore size reduction, the aspect ratio of spheroids has no threshold value to pass. The effects of orientation appear once the shape is asymmetrical, and increase with increasing aspect ratios; resulting the possible stepwise increases of, in conjunction to effect of pore size reduction, thermal insulation value from current standard to that of a new generation.

The third generation of thermal insulation material comprising and made from any, or a combination of, the following features:
    (a) generating homogeneously smaller gas embryos or domains by a homogeneous nucleation or spinodal decomposition process, using primarily $CO_2$, or a similar inert gas, entrapped as either a blowing agent or a co-solvent in a polymer system,
    (b) growing asymmetrical (oblate or prolate) pore morphology,
    (c) orienting asymmetrical (oblate or prolate) pores with their short axis along the insulation application (i.e. the temperature gradient) direction,
    (d) creating the secondary nanopore structure within air pores, which are to be formed by, but not limited to, the surfactant structure incorporated at the pore surface, or an intertwining fractal structure within each pore.

The material system of the third generation of thermal insulation is composed of a polymer, or a blend of polymers, foamed by embedded $CO_2$, or other inert gases, or their mixtures utilizing a homogeneous nucleation process.

The material system of the third generation of thermal insulation is composed of reactive oligomers such as, but not limited to, styrene and urethane, of which the polymerization reaction is utilized to secrete or generate volatile liquid phase such as, but not limited to $CO_2$, by a spinodal decomposition process for the subsequent expansion thorough the fluid evaporation. The volatile fluids of the system are embedded in under a high pressure, entrapped by the polymer(s) by supercooling, or during polymerization, and later released through an triggered foaming process to produce the insulation on demand and on location.

Figure 3:
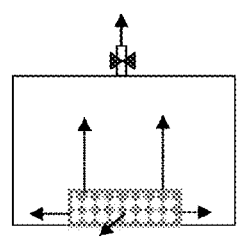
FIG. 3 shows the batch depressurization process to create prolate pore structure.
Figure 4:
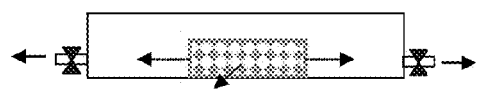
FIG. 4 shows the batch depressurization process to create oblate pore structure.

In the third generation of thermal insulation, one or all of the above attributes (a), (b) and (c) are created through a batch depressurization process designed based on principles of restricting expansion in one direction (the application direction) outlined in Examples 1 and 2 and FIGS. 3 and 4 of this invention.

In the third generation of thermal insulation, one or all of the attributes (a), (b) and (c) are created through a foam extrusion process with a die designed based on principles of restricting expansion in one direction (the application direction) outlined by Example 4 (FIG. 6) of this invention.

The production of the third generation of thermal insulation by these methods use both platelet molecules of the exfoliated clay to restrict expansion in the application direction (see Example 3 and FIG. 5), and platelet molecules of chemically modified and exfoliated clay to increase the solubility and the nucleation of the blowing gases ($CO_2$ or other inert gas).

The composition of the third generation of thermal insulation contains exfoliated clays as a major component (i.e. weight % equal to or greater than 5%).

The third generation of thermal insulation is comprised of a polymer-clay composite by the batch depressurization method previously described above.

A third generation of thermal insulation is made of a polymer-clay composite by the foam extrusion method previously described above.

The method of producing a third generation of thermal insulation includes the step of where the foam curing (i.e. stabilization) is accomplished by glass transition (such as demonstrated by polystyrene), crystallization (such as demonstrated by Polyethylene), cross-linking (such as demonstrated by rubbers), or polymerization (such as demonstrated by polyurethane).

A method of producing a third generation of thermal insulation which utilizes a composition including one or more of the components described herein, which is prepared by mixing under pressure in an extruder or a reactor, injected into a mold, followed by the batch depressurization method.

A method of producing a third generation of thermal insulation which utilizes a composition including one or more of the components described herein, which is prepared by mixing under pressure in an extruder or a reactor, stabilized by cooling below glass transition temperature of the polymer (to expandable polymer beads), and then injected into a mold, followed by a heat-triggered depressurization method.

The third generation of thermal insulation with the composition, structure and processing described herein which is utilized as building insulation products, refrigerator insulation products, HVAC (Heating, Ventilating and Air-conditioning) and refrigeration insulation products, industrial insulation products, and/or specialty insulation products, such as, but not limited to, aviation, space vehicles and stations, superconducting devices and equipment.

A porous product with the composition, structure and processing described herein, but with less porosity (porosity between 20-90%), may also be used as a foam product for, but not limited to, structural support, cushioning, protection, packaging, sports, entertainment, sound insulating, medical devices, and decoration.

EXAMPLES

One key step to produce finer-cell, high-porosity foams is to initiate gas blowing from a high pressure-drop. The larger the pressures drop, (i.e. deeper super saturation), the easier the induction of homogeneous nucleation. The challenge of foaming from a high pressure-drop is to control the bubble growth after nucleation. The melt temperature, molecular weight, viscoelasticity must be fine tuned for a successful foaming of low-density insulation. We can first simulate such a foaming process in a pressurized vessel and obtain necessary data of material and processing for future extrusion productions. These batch experiments also help demonstrate the working principles and the feasibility of making a super thermal insulation. They can also be scaled up for batch productions of insulation foam.

Example 1

Oriented Prolate Pores Reducing the Thermal K by 10-15%

Figure 2:
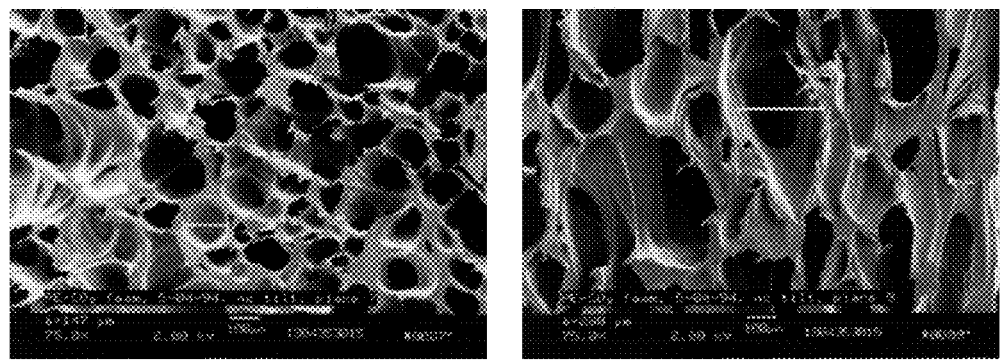
FIG. 2 shows the SEM pictures of the cell structure along two different directions. Through pressurized vessel experiments, foams with anisotropical pore structure have been produced.

Through pressurized vessel experiments, foams with anisotropical pore structure have been produced. FIG. 2 shows the SEM pictures of the cell structure along two different directions.

The particular sample shown in FIG. 2 was produced in a pressurized vessel with a sudden release of pressure by opening a valve at the top of the vessel. This setup, as shown in FIG. 3, provided a favorable direction of foam expansion (towards the top of the vessel), thereby creating anisotropic expansion ratios of the foam (higher expansion ratio to the top than to the sides). The difference in expansion ratios led to prolate (needle-like) cell structure shown by the TEM pictures above. The sample density was 0.023 gram/cc. Thermal conductivities measured along two directions (long polar axis and the short equator axes) were 37 and 33 mW/M·° K, respectively. The 12% reduction in thermal conductivity agreed well with our modeling results for the prolate geometry.

For a blowing and extrusion process, pore morphology control might be easier to achieve than the nanopore feature. The improvement in thermal resistance may be short of the dramatic increase achievable by nanopores, but still significant for gaining ground in the market place and contributing towards the goal of making super insulation.

Example 2

Oriented Oblate Pores Reducing the Thermal K by 30%

Our modeling results indicated a more significant improvement in insulation for the oblate geometry (short polar axis and long equator axes, i.e. disk-like) cell structure aligned normal to the heat flow direction. The thermal conductivity of a similar density to the above prolate example could be reduced down to 24 mW/M·° K, which would be even lower than the thermal K of current foam containing low thermal K gas such as HCFC. Such (oblate) cell structure could be created by a batch foaming process with restriction of expansion in the polar direction and free expansion in equator's directions as shown in FIG. 4.

Example 3

Using Exfoliated Clay to Facilitate Asymmetrical Pore Formations

Figure 5:
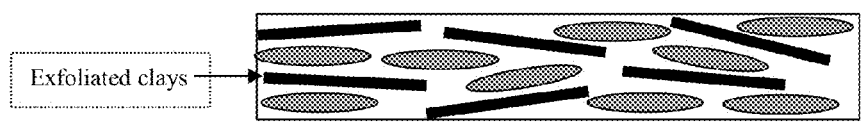
FIG. 5 shows the use of exfoliated clay platelet molecules to facilitate gas nucleation and asymmetrical expansion, leading to oblate pore structure.

While these two innovations lowered the risks of making large number of nanopores by a foaming process, the technical burden is shifted to the control of pores' geometry as well as their orientation during foaming. This invention includes specific material nanotechnology to facilitate the growth and orientation of spheroid pores. One method is the use of a polymer-clay composite with exfoliated clay layers as template for gas bubble formation. Clay molecules, after full exfoliation, have platelet structure with aspect ratio above 1000. By modifying the surface of a clay platelet, homogeneous nucleation can be enhanced within the galleries of neighboring platelet molecules and increases the formation of oblate pores as shown in FIG. 5. These highly anisotropic plate molecules (aspect ratio from 40 up to 1000) will be oriented under volume exclusion effect, or by the shear force of the extrusion to the preferred direction. The inorganic fillers can also improve the fire and smoke rating of the plastic foam material.

Example 4

Producing Orientated Cell Structure in a Foam Extrusion Process

Create and align oblate pores of an insulation with their short axes all along the insulation application direction (i.e. the temperature gradient direction) are difficult processing tasks. Previous two examples (1 and 2), by controlling the depressurization direction(s), provided design principles for a batch foaming process. It is more challenging to accomplish orientated oblate cell structure in a continuous foam extrusion process.

Figure 6:
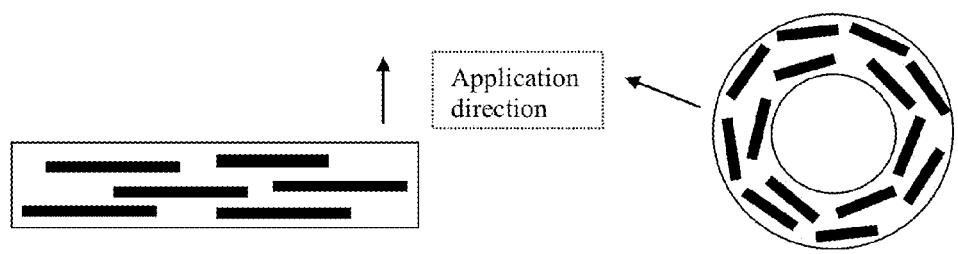
FIG. 6 shows the alignment of exfoliated clays in foam extrusion restricts bubble growth normal to machine direction.

Gas nuclei created during homogeneous nucleation are generally spherical and the pore geometry must be controlled during the bubble growth stage. In a batch foaming process, the bubble growth can be physically restricted in the insulation application direction, while allowing the bubble grow freely in the other two directions normal to the restricted direction. In a continuous foam extrusion process, the most cost-effective production method, the exfoliated clay platelet molecules can be relied upon to internally restrict bubble expansions (see FIG. 5). In a foam extrusion process (of sheets and pipes), the insulation application direction is perpendicular to the machine direction as shown in FIG. 6. The shearing force at the die opening zone can then be used to align exfoliated clay platelet molecules. The shear force aligns platelet molecules along the machine direction, which in turn then restrict the bubble from expansion in the insulation application direction. The detailed design of the die depends on the viscoelastic behavior of the polymer-clay composite and the required die pressure for a specific blowing gas.

Example 5

Secondary Nanostructure within a Pore to Scatter Air Molecules

A common way to reduce the thermal conductivity of foam is to use heavier gases such as CFC, HCFC, and HFC. These gases have a larger collision cross section and thus a smaller mean free path. Some polyurethane foam made with gases heavier than air could accomplish R-value similar to that of a super insulation. However, foams made with heavy gases will gradually lose their insulation value after these gas molecules diffusing out. In addition, the concerns over their ozone depleting hazards and extremely high global warming power had called for a complete ban of their uses in foaming process. The fourth component (d) of this invention is intended to apply a similar principle to reduce the thermal conductivity of air in the pore to further boost the foam insulation value, yet without the concerns of losing its superior property over time, or damaging the environment.

As in the use of heavier gases, more frequent collisions of air molecules would reduce the mean free path and the thermal conductivity of air. The increase in insulation value due to pore size reduction was also resulted from more frequent collisions of air molecules with the barrier walls. This invention includes a secondary (low-density, loose) nanostructure built within each air pocket to further increase the collision frequency with air molecules and thereby reduce the thermal conductivity of the air in the pores. Since these secondary structures do not carry the extra burden of mechanically supporting the foam structure, the secondary structures can be made with extremely low densities while containing a large surface area to effectively scatter incoming air molecules. The structure can be formed by, but not limited to, the surfactant structure incorporated at the pore surface or an intertwining fractal structure within each pore.

Figure 7:
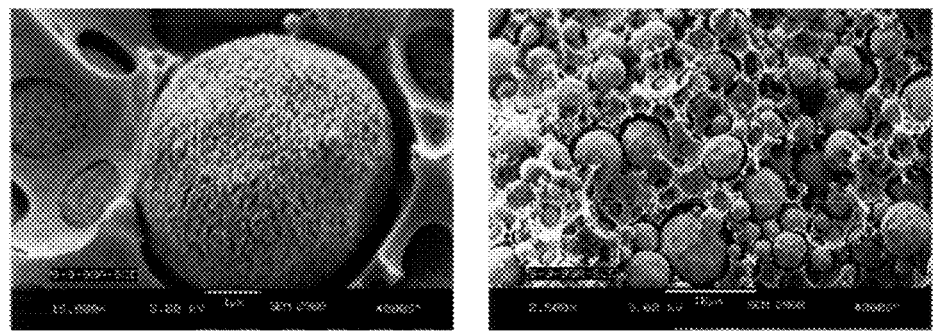
FIG. 7 shows a pair of SEM pictures depicting secondary aerogel fractal structures with two kinds of pores, micron size and nanometer size.

The following example demonstrated the feasibility of this idea. Combining previous aerogel technology with styrene inverse emulsion technology, a secondary aerogel fractal structure was formed within Styrofoam. There are two kinds of pores, micron size and nanometer size, within the structure. The micron size pores, created by emulsification, are filled with nanopore aerogels. A pair of SEM pictures is shown in FIG. 7 to reveal the microstructure. The scale bars are one micron for the picture at left and ten microns for the picture at right respectively. The visible cavities are pores created by emulsification. The balls sitting in the cavity are silica aerogel providing the secondary nanostructure. The thermal conductivity of this composite was ~20 mW/M·° K, example of a super insulation. However, the composite was made by a supercritical drying process, not by a gas foaming process outlined by this invention.

The addition of components (b), (c) and (d) expanded options of making the third generation of thermal insulation. Instead of focusing only on pore size reduction, other means of controlling pore morphology have been added to increase the thermal insulation value of embedded air, which is the defining statement of the third generation of thermal insulation. Moreover, with this invention, in particular component (d), the mechanical and insulating properties of the foam composite can be independently addressed and adjusted, making the production of a super insulation by a gas blowing process substantially easier. Further, the implementation of each option would respectively contribute to incremental improvement in insulation value towards the ultimate goal of making super thermal insulation. These progressive advancements, instead of a quantum leap, to the new generation of insulation product would create more commercialization opportunities on the road towards a revolutionary super insulation product.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. An article comprising a material system with at least 95% porosity, wherein said porosity consists of greater than 50% of asymmetrical nanopores comprising embedded inert gas and having a pore size no more than 1500 nanometers in its shortest dimension, as determined by SEM.

2. An article according to claim 1, wherein said material system comprises:
   i) a polymer,
   ii) a reactive oligomer, or is derived from a reactive oligomer,
   iii) a monomer, or is derived from a reactive monomer, or
   iv) combinations thereof.

3. An article according to claim 2, wherein said reactive oligomer comprises an ethylenically unsaturated styrene, urethane, and mixtures thereof.

4. An article according to claim 3, wherein said inert gas includes any of the known inert gases or combinations of the same, preferably the inert gas comprises $CO_2$ (inclusive of predominately $CO_2$ and/or mixtures comprising $CO_2$).

5. An article according to claim 1, wherein said asymmetrical nanopores are oblate or prolate.

6. An article according to claim 1, wherein the longest axis of said asymmetrical nanopores is normal to the thermal gradient direction, and the pore orientation of said asymmetrical nanopores is oriented normal to said thermal gradient direction.

7. An article according to claim 6, wherein said thermal gradient direction is nominally in-line with the shortest dimension of the majority of said asymmetrical nanopores and aligned with the application direction of a thermal insulation.

8. An article according to claim 1, wherein said asymmetrical nanopores comprise a secondary nanopore structure.

9. An article according to claim 1, wherein said article has a thermal insulation value greater than 7 R/inch.

10. An article according to claim 1, wherein said article has a thermal insulation value greater than 10 R/inch.

11. An article according to claim 1, wherein said article has a thermal conductivity less than 23 mW/M°K.

12. An article according to claim 1, wherein said article has a thermal conductivity less than 20 mW/M°K.

13. An article according to claim 1, wherein said article is used in products used for building insulation, refrigerator insulation, HVAC insulation, and specialty insulation products.

14. An article according to claim 13, wherein said specialty insulation products comprise aviation, space vehicles and stations, and superconducting devices and equipment.

15. An article according to claim 7, wherein the application direction of the thermal insulation is the direction of the temperature gradient.

16. An article according to claim 1, wherein said asymmetrical nanopores comprise a secondary nanopore structure to further elevate the thermal insulation effect of the nanopores.

* * * * *